United States Patent
Kock et al.

(10) Patent No.: US 7,357,419 B2
(45) Date of Patent: Apr. 15, 2008

(54) FASTENING FOR A SAFETY BELT BUCKLE, WHICH IS EQUIPPED FOR MEASURING THE BELT FORCE ARRANGEMENT

(75) Inventors: Hans-Otto Kock, Kiebitzreihe (DE); Frank Jacobs, Rosengarben (DE); Bernd Knörle, Westendorf (DE)

(73) Assignee: Autoliv Development AB (SE)

( * ) Notice: Subject to any disclaimer, the term of this patent is extended or adjusted under 35 U.S.C. 154(b) by 316 days.

(21) Appl. No.: 10/511,917

(22) PCT Filed: Apr. 16, 2003

(86) PCT No.: PCT/EP03/03965

§ 371 (c)(1), (2), (4) Date: Jun. 21, 2005

(87) PCT Pub. No.: WO03/086827

PCT Pub. Date: Oct. 23, 2003

(65) Prior Publication Data

US 2006/0012236 A1 Jan. 19, 2006

(30) Foreign Application Priority Data

Apr. 18, 2002 (DE) ................................ 102 17 227

(51) Int. Cl.
*B60R 22/00* (2006.01)

(52) U.S. Cl. ...................... 280/801.1; 180/268; 24/633
(58) Field of Classification Search ................ 280/805, 280/801.1; 180/268; 297/268; 73/862.381, 73/862.391; 701/45; 24/651, 641, 633
See application file for complete search history.

(56) References Cited

U.S. PATENT DOCUMENTS 5,941,337 A 8/1999 Castellanos (Continued)

FOREIGN PATENT DOCUMENTS

DE 196 54 277 6/1998

(Continued)

OTHER PUBLICATIONS

Data Sheet KMZ41—Magnetic Field Sensor.

(Continued)

*Primary Examiner*—Toan To
(74) *Attorney, Agent, or Firm*—Robert W. Becker; Robert W. Becker & Assoc.

(57) ABSTRACT

A fastening arrangement for a safety belt is provided and includes a holder for securement to a vehicle. The holder has a T-shaped head with laterally extending arms. A connector is moveably disposed, against spring action on the holder and is connected to a belt buckle strap loop. A magnet and magnetic field sensor are disposed on the holder and connector. Relative movement between them, caused by displacement of the connector relative to the holder, is converted into a signal that corresponds to acting belt force. First springs are provided on outer longitudinal sides of the holder and connector and respectively extend between the arms of the holder and an oppositely disposed abutment of the connector to counteract tension force of the safety belt or buckle. The compensation spring is disposed between the holder and connector and, without a tension force acting on the connector, prestresses the connector relative to the holder against nearly relaxed first springs with a low spring force.

21 Claims, 6 Drawing Sheets

U.S. PATENT DOCUMENTS

| | | |
|---|---|---|
| 6,209,915 B1 | 4/2001 | Blakesley |
| 6,230,088 B1 | 5/2001 | Husby |
| 6,400,145 B1 | 6/2002 | Chamings |
| 6,566,869 B2* | 5/2003 | Chamings et al. ..... 324/207.26 |
| 6,679,524 B2* | 1/2004 | Greib et al. ............. 280/801.1 |
| 6,746,048 B2* | 6/2004 | Tajima et al. ............ 280/801.1 |
| 6,793,032 B2* | 9/2004 | Lichtinger et al. .......... 180/268 |
| 6,820,458 B2* | 11/2004 | Grzic ........................ 73/1.15 |
| 7,000,488 B2* | 2/2006 | Ante et al. ............. 73/862.391 |
| 7,007,976 B2* | 3/2006 | Ante et al. ............... 280/801.1 |
| 7,021,162 B2* | 4/2006 | Ante et al. ............. 73/862.391 |
| 7,144,042 B2* | 12/2006 | Eichwald .................... 280/805 |
| 2003/0155166 A1* | 8/2003 | Sullivan et al. ............. 180/268 |
| 2004/0060761 A1* | 4/2004 | Almaraz et al. ............. 180/268 |
| 2004/0111846 A1* | 6/2004 | Itoigawa et al. ............... 24/633 |
| 2004/0245761 A1* | 12/2004 | Maloney et al. ......... 280/801.1 |

FOREIGN PATENT DOCUMENTS

FR      2074616      10/1971

OTHER PUBLICATIONS

Data Sheet UZZ9000—Sensor Conditioning Electronic.

* cited by examiner

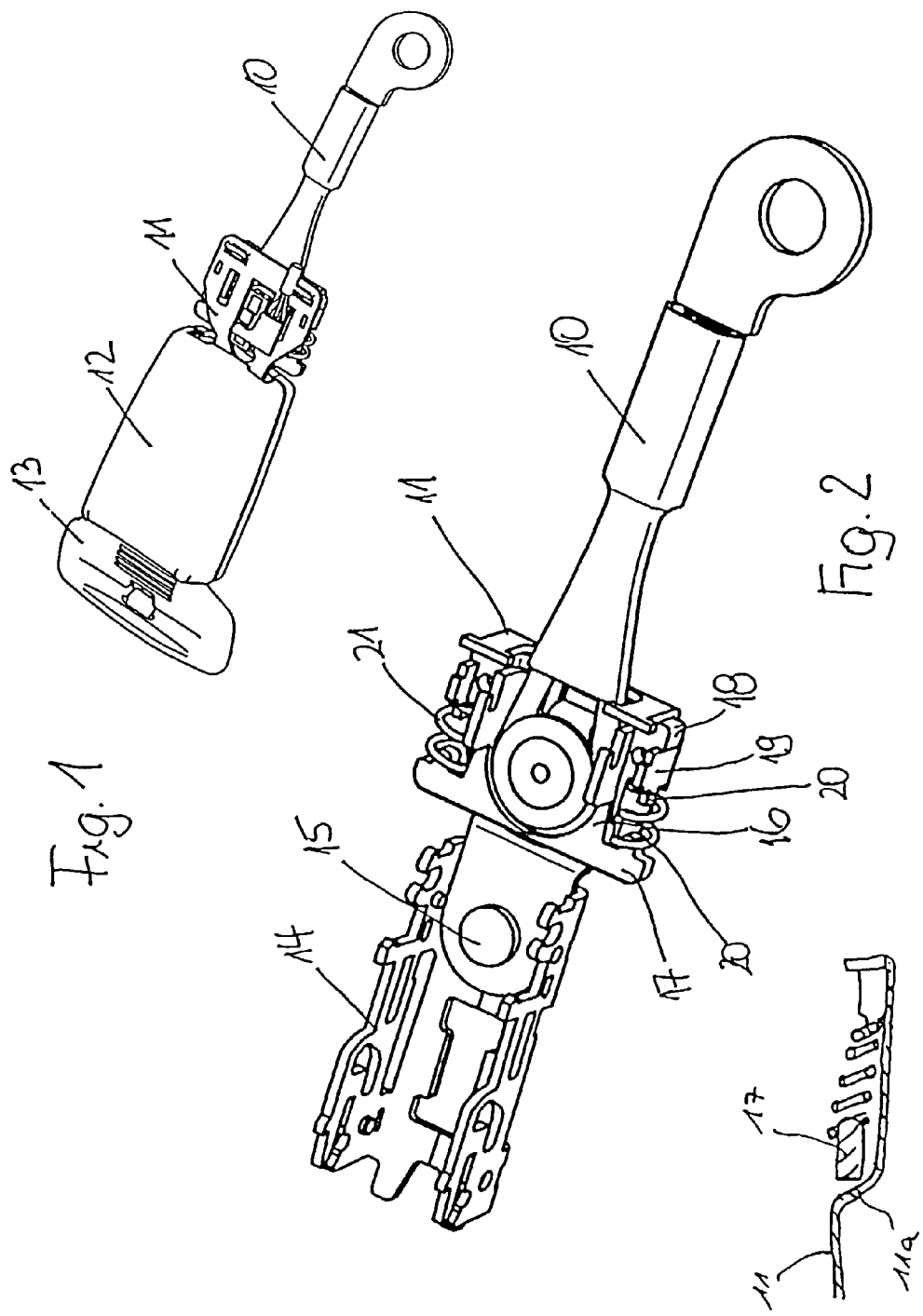

FASTENING FOR A SAFETY BELT BUCKLE, WHICH IS EQUIPPED FOR MEASURING THE BELT FORCE ARRANGEMENT

BACKGROUND OF THE INVENTION

The invention relates to a fastening arrangement for a safety belt, comprising a holder that is to be secured to a vehicle, and a connector that is moveably disposed, against spring action, on the holder, and is connected to a belt buckle or a belt strap loop, whereby a magnet and a magnetic field sensor are disposed on the holder and connector, and the relative movement between magnet and magnetic field sensor caused by displacement of the connector relative to the holder, which displacement is effected by the tension acting on the belt buckle, is converted into a signal that corresponds to the acting belt force.

A fastening arrangement having the aforementioned features and provided for a belt buckle is described in WO 01/79039 A1; such a fastening arrangement for a safety belt buckle, and provided with a sensor arrangement, serves for determining the belt force that respectively occurs in the safety belt system under various stress conditions, in order as a function of the measured belt force to control further components of the safety system, such as, for example, airbag devices.

With the known fastening arrangement, formed in the holder that is secured on the vehicle side is a region within which is moveably disposed a carriage that is guided on the holder; at least one compression spring disposed between holder and carriage tensions the carriage relative to the holder and enables a displacement of the carriage in the holder portion in conformity with the spring path. The connector that is connected with the belt buckle is embodied as a loop that extends through the portion of the holder and thereby spans the outer contour of the carriage that is moveable in the holder portion in such a way that a tension force that acts upon the connector brings about a displacement of the carriage in the portion of the holder against the force of the compression spring. Mounted on the holder and carriage, in a cooperative association, are a magnet and a magnetic field sensor, so that the relative movement of carriage and holder to one another in conformity with the respectively occurring belt force is to be detected via the change of the magnetic field that is received by the magnetic field sensor, and is capable of being converted in a microprocessor into a suitable signal for the control of further components of the vehicle safety system.

The known fastening arrangement has the drawback of a complicated construction and a cumbersome assembly. For example, the holder, and the carriage that is moveably guided therein, must be produced with the necessary precision and must be assembled together with the springs, whereby the assembly or mounting of the carriage on the holder is cumbersome due to the compression springs that are disposed within the portion of the holder. The connector, with its loop, must then be guided through the recess of the holder in a further assembly step, and in so doing must be oriented relative to the carriage, whereby the loop must again be reliably closed at the conclusion of the assembly.

It is therefore an object of the invention to simplify the construction and assembly of a fastening arrangement having the aforementioned features.

SUMMARY OF THE INVENTION

The fastening arrangement of the present application comprises a holder for securement to a vehicle, wherein the holder is provided with a T-shaped head having arms that extend laterally relative to the longitudinal axis of the holder; a connector that is moveably disposed, against spring force, on the holder, wherein the connector is adapted to be connected to a belt buckle or a belt strap loop, and wherein the connector is provided with abutments positioned opposite the arms of the holder; a magnet and a magnetic field sensor disposed on the holder and the connector, wherein relative movement between the magnet and the magnetic field sensor caused by displacement of the connector relative to the holder, which displacement is effected by tension acting on the safety belt, is converted into a signal that corresponds to the acting belt force; first springs provided on outer longitudinal sides of the holder and the connector, wherein respective ones of the springs extend between each of the arms of the holder and an oppositely disposed abutment of the connector, and wherein these springs counteract a tension force of the safety belt of belt buckle; and a compensation spring that is disposed between, and is respectively supported on, the holder and connector, wherein the compensation spring, without a tension force acting on the connector, prestresses the connector relative to the holder against nearly relaxed ones of the first springs with a spring force that is set low.

A buckle holder having a T-shaped head is known from DE 196 54 277 A1, although no belt force measurement is provided.

The invention has the advantage that it is possible to eliminate the separate carriage provided in the state of the art because holder and connector are mounted directly on one another. The particularly selected arrangement of the springs on the outer longitudinal sides of holder and connector insures a good accessibility during assembly of the fastening arrangement and during insertion of the springs between connector and holder, so that the assembly of the fastening arrangement is considerably simplified. The springs arranged on the outside additionally prevent a lateral deflection of connector and holder relative to one another, so that the precision of measurement of the sensor arrangement disposed between holder and connector is improved.

One embodiment of the invention provides that the connector comprises two plates that are parallel to one another and enclose or encase between them the T-shaped head of the holder, including the arms thereof, and the abutments formed on the connector for the springs are formed by connecting flanges disposed perpendicular to the plane of the plates. This ensures a good guidance of the connector during its displacement relative to the holder.

One embodiment of the invention proposes the use of compression springs as springs disposed between the arm of the holder and the abutment; this offers the advantage that in extreme load conditions, for example during a crash, the compression springs are pulled as a unit and thus large forces can also be transferred without destroying the compression springs.

Pursuant to an embodiment of the invention, the connector is provided with an abutment surface against which is supported the T-piece of the holder that is loaded by the compression springs.

To facilitate assembly and improve the spring effect, pursuant to one embodiment of the invention there are formed on the arms of the T-shaped head, and on the abutments of the connector, guide members that project in the direction of extension of the compression springs.

Pursuant to embodiments of the invention, the connector can be connected via a connecting means with the buckle housing, or the connector can be a monolithic component of the buckle housing.

To the extent that a monolithic embodiment of buckle housing and connector is provided, one embodiment of the invention provides that the buckle housing, which is embodied in a U-shaped manner with a base plate and laterally raised U-legs, for the embodiment of the one-piece connector, is provided with an axial extension portion of its base plate, on the ends of which are formed the abutments accompanied by the formation of a space relative to the U-legs. This not only has the advantage of a reduction of the overall size of the buckle housing with connector, but rather also the number of individual components is reduced, so that a correspondingly low assembly expenditure and effort result. In this connection, it can be provided that the arms of the holder, including the arrangement of the springs, be disposed in the space, whereby the holder is secured on the base plate of the buckle housing so as to be relatively moveable to it.

As can be gathered in principle from the prior art document, the holder can be embodied as a rigid component or as a flexible cable holder. The flexible cable holder offers the advantage of a significantly higher precision of measurement; this is achieved in that the belt buckle can respectively be adapted to the direction of the belt application.

The direct coupling of connector and holder makes it possible, pursuant to an embodiment of the invention, to select a sensor arrangement where the magnet comprises a bar magnet that is oriented in the longitudinal direction of holder and connector, and is mounted on the inner side of the connector that faces the T-shaped head of the holder, and the longitudinal axis of the magnetic field sensor is mounted at a right angle to the longitudinal axis of the bar magnet and within the magnetic field thereof on the head of the holder, whereby it can be provided that the bar magnet be mounted on the one plate of the connector, and that on the other plate there be formed a portion or cutout that spans the magnetic field sensor.

In an alternative embodiment, a formation of the sensor arrangement is provided where the magnet comprises a bar magnet that is oriented in the longitudinal direction of holder and connector, and is rotatably mounted on the connector, and on the connector is disposed the magnetic field sensor that detects the change in position of the bar magnet, and that during its displacement relative to the connector, the holder deflects the bar magnet out of its orientation in the longitudinal axis of the connector, whereby it can be provided that the head of the holder engage via an articulated lever arm against the bar magnet that is rotatably mounted on the connector. However, alternatively the head of the holder can also act directly upon the rotatably mounted bar magnet.

In particular the one-piece embodiment of buckle housing and connector provides the possibility of also embodying the arrangement of the magnet as well as of the magnetic field sensor in a simple form, and it is thus provided pursuant to an embodiment of the invention that the magnetic sensor be mounted on the holder, and the magnet be embodied in the form of a bridge that spans the base plate of the buckle housing and is fixed in position on the lateral U-legs of the buckle housing, and be disposed in such a way that the magnetic field sensor be disposed below the magnet bridge.

In this connection, it can be expedient for the magnetic field sensor to be secured on the holder via a sealing compound that encloses it.

For a use within the framework of the invention conventional magnetic field sensors are suitable that are described in the data sheets "KMZ41 Magnetic Field Sensor" of 18 Apr. 2000 or "UZZ9000 Sensor Conditioning Electronic" of 27 Nov. 2000 of the Philips Semiconductors Company.

The provision of the relative movement between holder and buckle housing, accompanied by the interposition of the springs, can in individual cases lead to the formation of a tolerance chain having a correspondingly high tolerance window, which on the one hand can cause noise problems due to rattling of the components, and on the other hand can also cause a delayed response of the measuring arrangement. Pursuant to one embodiment of the invention, this is to be counteracted, for example, in that the measuring forces, with appropriate design of the measuring springs in the longitudinal direction, are to be applied centrally on the measuring springs so that the measuring springs continue to be provided with a pre-stress; however, despite the pre-stress, during introduction of a belt force there would already result a change in path of the magnetic field sensor relative to the magnet.

A proposal that is structurally easy to realize for overcoming the aforementioned problem comprises, pursuant to an embodiment of the invention, disposing between holder and buckle housing a compensation spring that is respectively supported on holder and buckle housing and that, without a tension force acting on the buckle housing, pre-stresses the buckle housing relative to the holder against the nearly relaxed spring with a spring force that is set low. In so doing, pursuant to an embodiment of the invention the compensation spring can be embodied as a pre-bent flat spring that via a central portion is fixed in position on the buckle housing, with its lateral outer ends acting upon the holder with pre-stress and, when a relative displacement of the buckle housing with connector relative to the holder is effected, coming free from the holder due to the tension force that engages the buckle housing. Thus, a floating system is made available according to which with every change in force a path change also results, so that it is advantageously possible to also detect via a measuring technique a region of low force acting upon the buckle housing.

The invention is not limited to the arrangement at a belt buckle, but rather also covers embodiments where the belt force measurement is provided at an end fitting for the safety belt. In this case, a belt loop engages directly at the connector, so that the tension force that is exerted upon the safety belt acts directly upon the connector. Furthermore, where the fastening arrangement is embodied as an end fitting, the holder can have a two-part configuration, including a holding portion that is to be secured to the vehicle, and a fitting portion that is provided with the lateral arms and to this extent cooperates with the connector. This provides the possibility of adapting the holding portion to the respective installation position of the end fitting in the vehicle, without this affecting the measurement arrangement.

BRIEF DESCRIPTION OF THE DRAWINGS

Exemplary embodiments of the invention are provided in the drawings and are described in the following. Shown are:

FIG. 1 an overall illustration of a belt buckle having a fastening arrangement,

FIG. 2 the fastening arrangement for holding the buckle housing in a detailed illustration and in a partially assembled state without the sensor arrangement, FIG. 2a an enlarged schematic illustration of the detail "X" in FIG. 2

DESCRIPTION OF SPECIFIC EMBODIMENTS

Figure 3:
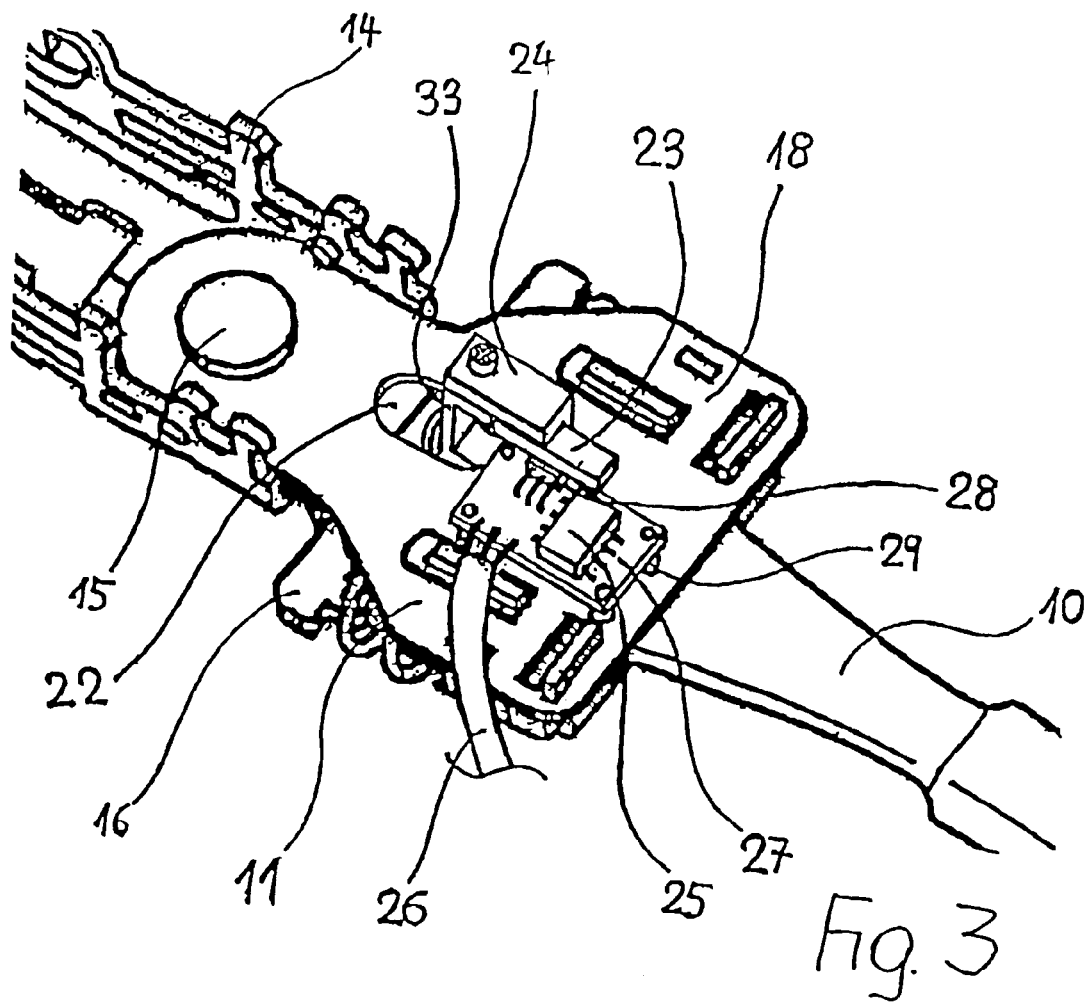
FIG. 3 the subject matter of FIG. 2 in the final assembled state, including the sensor arrangement, FIGS. 3a, 3b the association of bar magnet and magnetic field sensor in a detailed illustration, FIG. 4 another embodiment of the fastening arrangement of FIG. 3, FIG. 4a an enlarged detailed illustration of the support of the bar magnet of FIG. 4, FIG. 5 another embodiment of the subject matter of FIG. 2, FIG. 6 a detailed illustration of the buckle housing including connector pursuant to FIG. 5, FIG. 7 the subject matter of FIG. 6 with the connection of the holder without integration of the measurement arrangement, FIG. 8 an enlarged illustration of the arrangement of an additional compensation spring with the subject matter of FIG. 7, with the belt buckle in a non-loaded state, FIG. 9 the subject matter of FIG. 8 with the belt buckle subjected to tension force, FIG. 10 an overall view of an embodiment of the fastening arrangement in an embodiment as an end fitting for the holding of the safety belt, FIG. 11 the subject matter of FIG. 10 with the housing caps removed, FIG. 12 a detailed illustration of the holder of FIG. 11.

As can be seen initially from FIG. 1, the fastening arrangement for a safety belt lock or buckle 12 comprises a holder 10 that is to be secured to a vehicle, whereby the belt buckle 12 is fixed in position on the holder 10 via a connector 11 in a manner that will be described in detail subsequently. Substituent of the belt buckle 12 is a tongue 13.

As can be seen in greater detail from FIG. 2, the buckle housing 14 is connected via a connecting rivet or pin 15 with an extension of the connector 11. The holder 10 has a T-shaped head 16 with arms 17 that extend laterally relative to its longitudinal axis. The head 16 of the holder is encased by the connector 11, which is comprised of two plates 18, thus ensuring an adequate guidance of the connector 11 on the holder 10. The two plates 18 are interconnected by connecting elements or flanges 19 that are disposed perpendicular to their plane, whereby the connecting flanges act as abutments, which are positioned opposite the lateral arms 17 of the holder 10, with the arrangement of compression springs 21 that are disposed at the outer longitudinal sides of the head 16 and the connector 11, with as great a spacing as possible to their aligned longitudinal axis. To facilitate the mounting of the compression springs 21, and for their guidance, formed on the lateral arms 17, as well as on the connecting flanges 19, are guide members 20 that respectively project in the longitudinal direction of the compression springs 21.

As can be seen from the schematic illustration of FIG. 2a, the connector 11 is provided with a contact or bearing surface 11a that is formed by a bend and against which the T-shaped head 16 of the holder 10 is supported due to its pre-stress by the compression springs 21 in the direction of the buckle housing 14. To the extent that instead of the compression spring 21 the use of a tension spring is also conceivable, the bearing surface must be appropriately formed on the holder 10.

As can be seen in detail in FIG. 3, the T-shaped head 16 of the holder 10 is fixedly connected with a carrier element 33 on which a bar magnet 23 is fixedly disposed via a holding device 24. Disposed on the upper plate 18 of the connector 11 is a carrier plate 27 for a magnetic field sensor 28; the carrier plate 27 is connected with the plate 18 via securement elements 29, and is connected via a connecting cable 26 to a control device, on the vehicle side, or further components of the safety system. It is also possible to dispose on the carrier plate 27 further elements 25 via which, for example, a measurement signal can be further processed, or various transfer protocols are made possible.

Figures 3A, 3B:
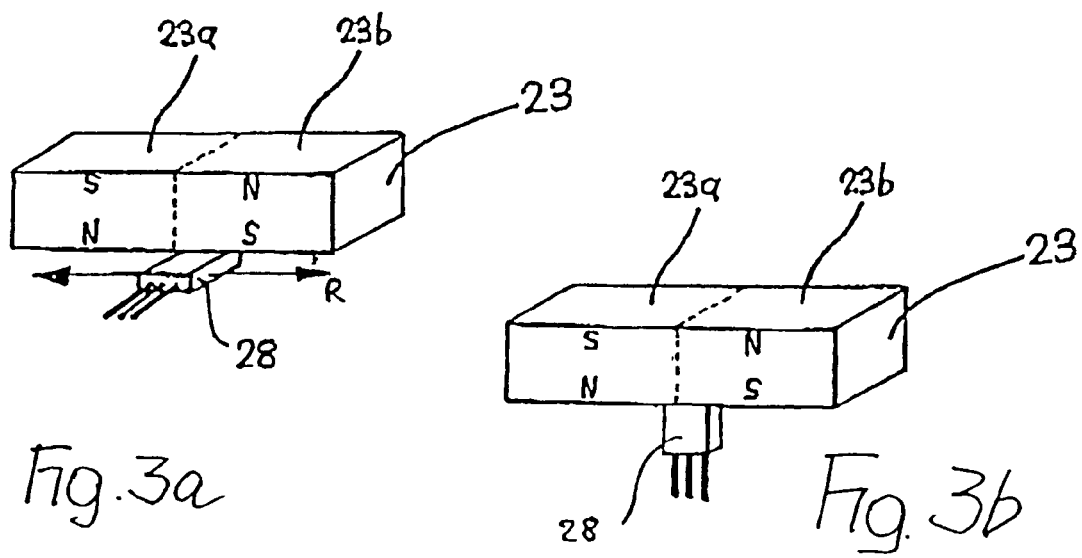

As can furthermore be seen from FIG. 3 in conjunction with FIG. 3b, the longitudinal axis of the magnetic field sensor 28 is oriented at right angles to the longitudinal axis of the bar magnet 23, so that a change in position of the bar magnet 23 leads to a rotation of the magnetic field relative to the magnetic field sensor 28, which is deleted or received by the magnetic field sensor 28.

Particularly advantageous for the arrangement of bar magnet 23 and magnetic field sensor 28 is, pursuant to FIG. 3a, a bar magnet 23 that is comprised of two oppositely polarized magnets 23a and 23b. The shifting of the magnetic field sensor 28 in the longitudinal direction R relative to the bar magnets 23, and at right angles to the directions of magnetization, effects a correspondingly large change in direction of the magnetic field that acts upon the magnetic field sensor 28.

Figure 4:
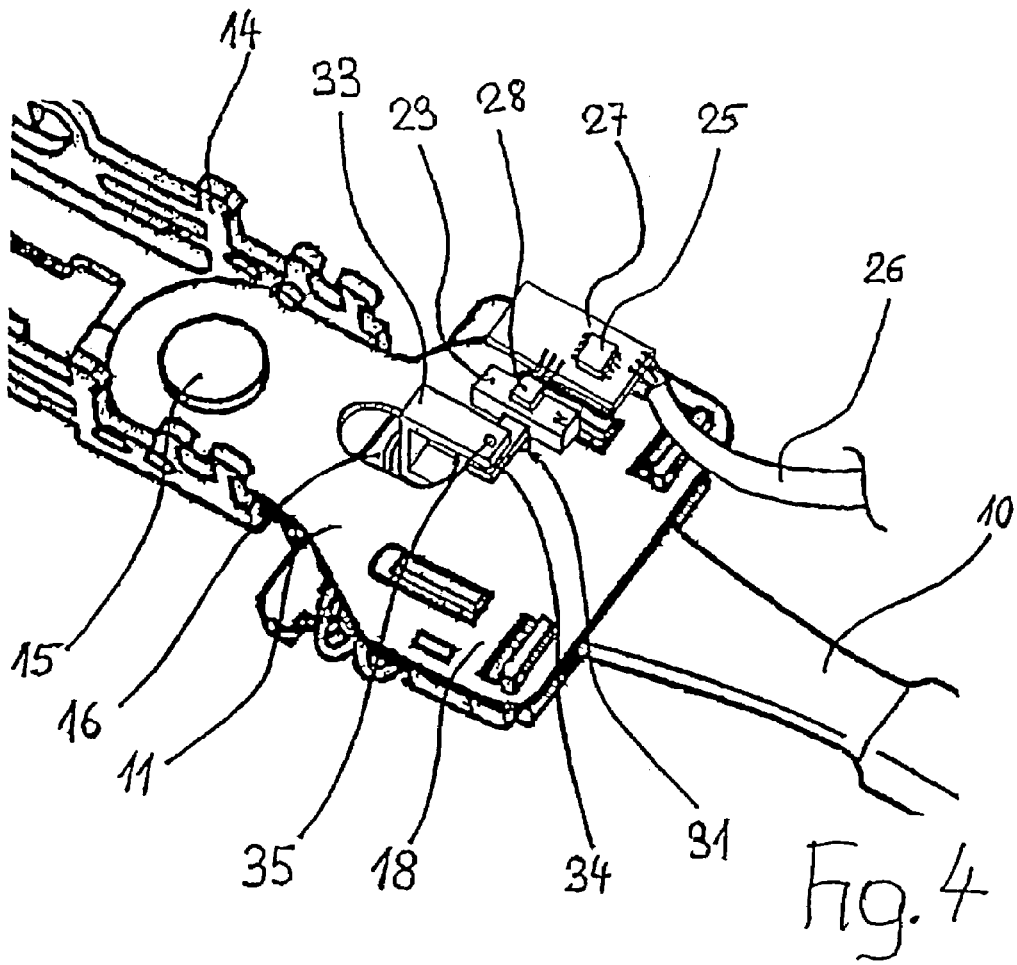
Figure 4A:
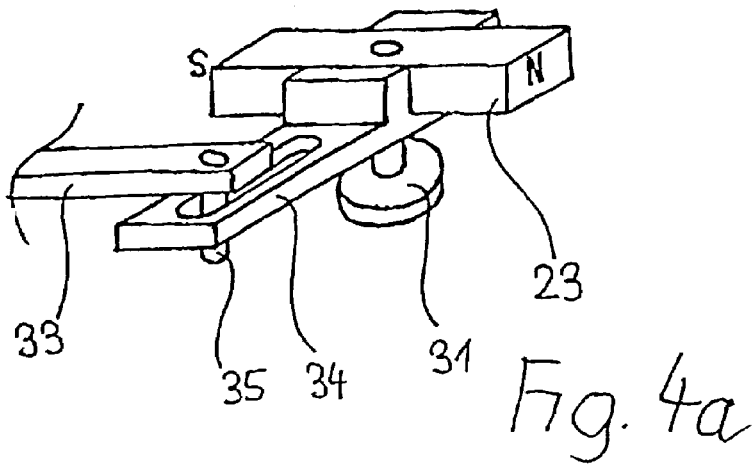

An arrangement comparable to the previously described embodiment results from the embodiment illustrated in FIGS. 4 and 4a, according to which the bar magnet 23, via a rotary support 31, is rotatably disposed on the upper plate 18 of the connector 11. Fixedly disposed on the bar magnets 23 is a lever arm 34, with its longitudinal axis extending at right angles to the direction of movement of the T-shaped head 16 of the holder 10 relative to the connector 11.

In the same manner as with the embodiment described in conjunction with FIG. 3, a magnetic field sensor 28 having carrier plate 27 and connecting cable 26 is associated with the rotatably mounted bar magnets 23; the carrier plate is again secured to the upper plate 18 of the connector 11. In the same way further elements 25 can also be disposed on the carrier plate 27, as mentioned above.

A carrier element 33 is fixedly connected with the T-shaped head 16 of the holder 10, whereby the carrier element 33, via a rotatable support 35, is coupled with the end of the lever arm 34 in such a way that a displacement of the connector 11 relative to the holder 10 leads to a pivoting of the rotatably mounted bar magnet 23 out of its alignment in the longitudinal axis of the holder 10, whereby this change in position of the bar magnet 23 in turn effects a rotation of the magnetic field, which is received by the magnetic field sensor 28.

Figure 5:
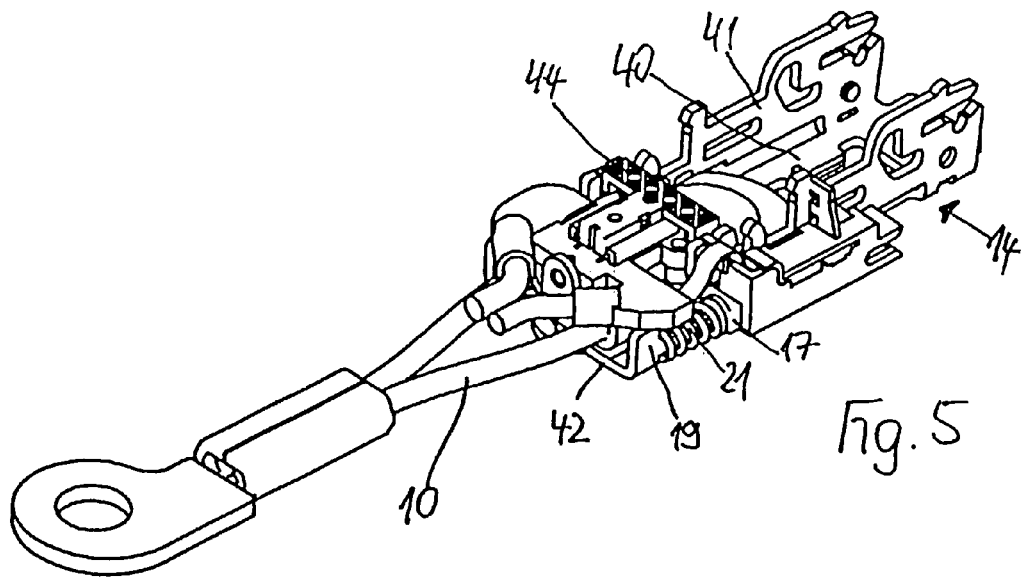
Figure 6:
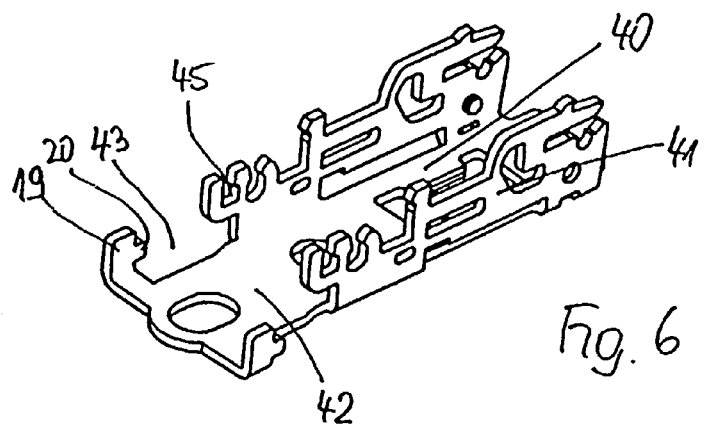
Figure 7:
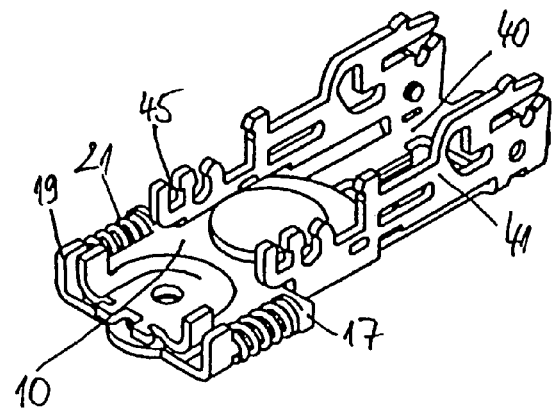

The embodiment illustrated in FIGS. 5 to 7 shows a buckle housing 14 that is monolithically formed with the connector 11 and which is embodied in a U-shaped manner with a base plate 40 and U-legs 41 that project laterally up therefrom. The buckle housing 14 is provided, in an extension of the base plate 40, with an extension portion 42, on the ends of which, accompanied by the formation of a space 43, are formed the abutments 19 for the placement of the compression springs 21, whereby the abutments 19, in turn, are provided with guide members 20. As can be seen in particular from FIG. 7, the holder 10, with its T-shaped head 16 and the laterally extending arms 17, is inserted into the extension portion 42 of the buckle housing 14 in such a way that the lateral arms 17, including the compression springs 21 that are disposed between the lateral arms 17 and the abutments 19, are disposed in the space 43. With this embodiment, the measuring arrangement is such, as can be seen from FIG. 5, that the magnetic field sensor, which is not recognizable in detail in FIG. 5, is mounted on the holder 10, for example by securement via a sealing compound, which has the advantage that the connecting cable is not subjected to any movement since the holder 10 is stationary. In this case, the magnet that is associated with the magnetic field sensor is embodied as a magnet bridge that spans the extension portion 42 and hence the securement of the holder 10 thereon; the magnet bridge is adapted to be positively fixed in position in the lateral U-legs 41. This provides a particularly straightforward manner of construction.

Figure 8:
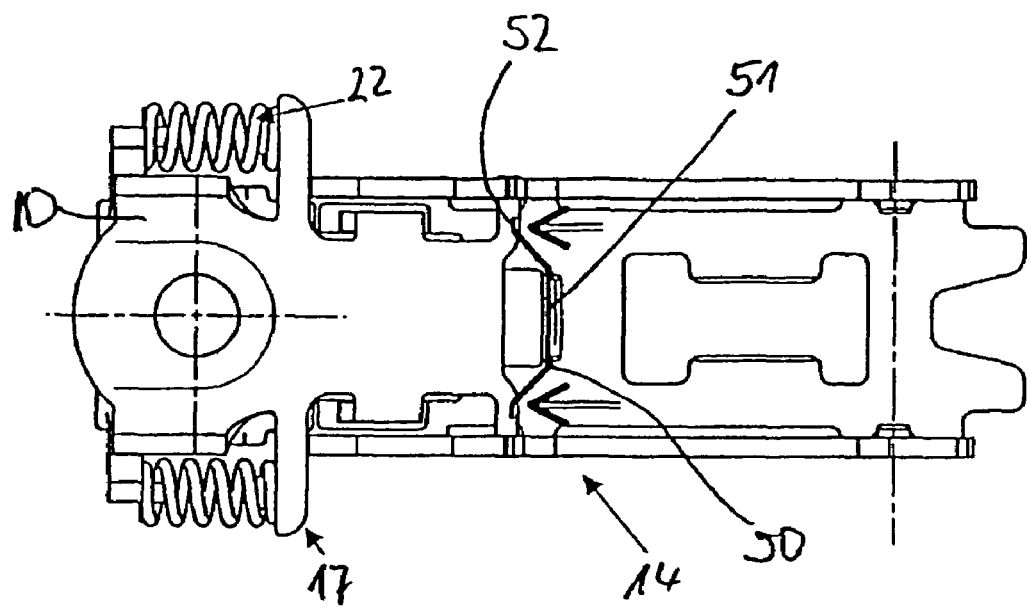
Figure 9:
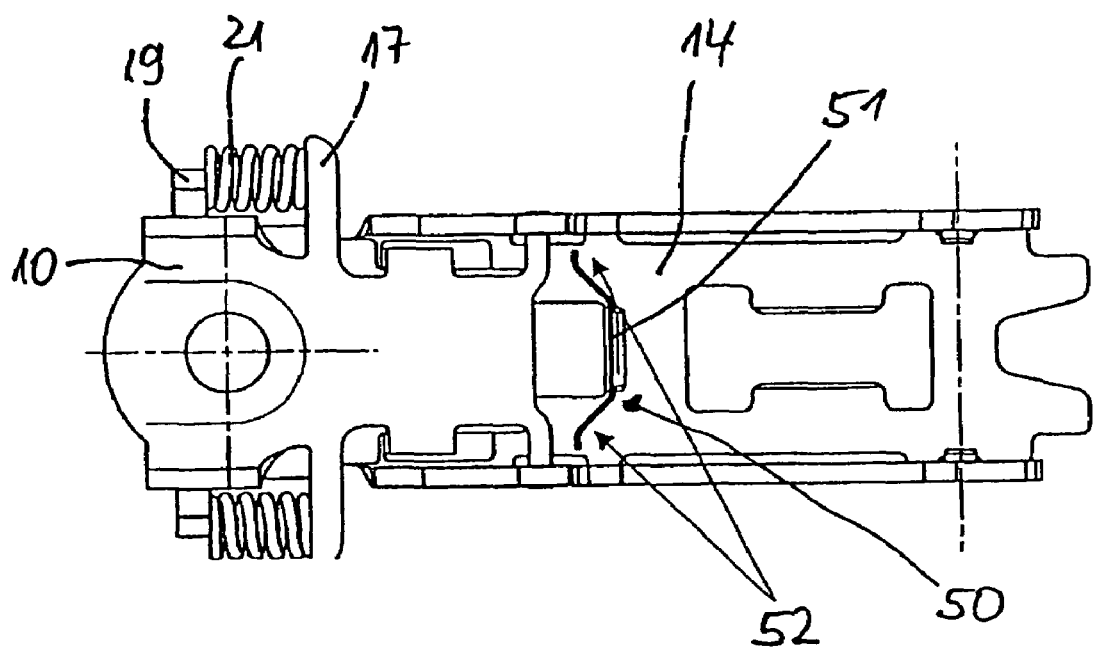

To suppress the influence of possible tolerances, with the embodiment illustrated in FIGS. 8 and 9 there is disposed in addition between the holder 10 and the buckle housing 14 a compensation spring 50 that is embodied as a curved, pre-bent flat spring; the central region 51 of this curved flat spring is fixed in position on the base plate 40 of the buckle housing 14, whereby the lateral, outer ends 52 of the flat spring, when the belt buckle or buckle housing 14 is in a non-loaded state, are supported against the ends of the holder 10 and in so doing press the holder 10 with a force that has been set low against the nearly relaxed compression springs, which act as measurement springs (FIG. 8). If under load there is effected a displacement of the buckle housing 14 relative to the stationary holder 10, the compression springs 21 are tensioned; at the same time, the outer ends 52 of the compensation spring 50 are freed from the holder 10, so that the correspondingly exerted tensioning force is released and the detection of the relative displacement of buckle housing 14 to holder 10 via the measuring arrangement is not affected.

Figure 10:
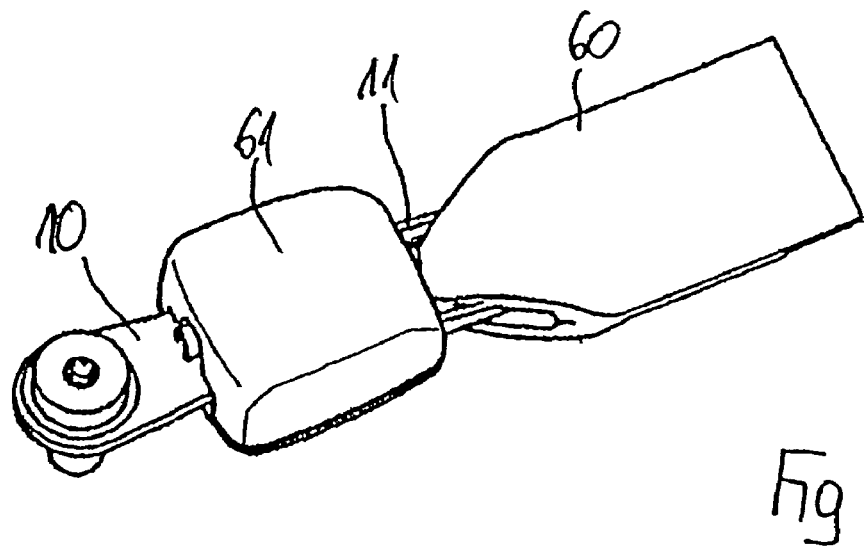
Figure 11:
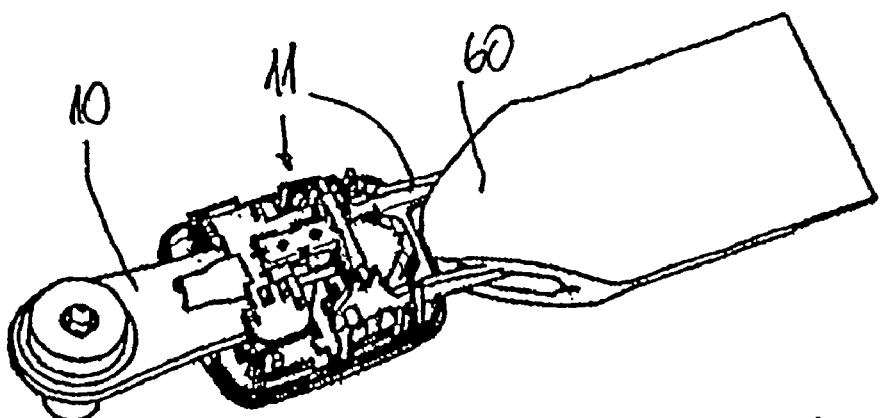
Figure 12:
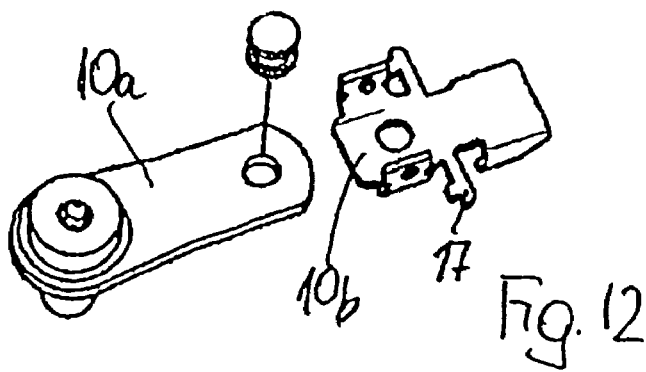

Finally, FIGS. 10 to 12 illustrate an embodiment of the invention according to which the fastening arrangement is embodied as an end fitting for holding a safety belt, as can be seen in FIG. 10. In so doing, the measuring arrangement between the holder 10 and the connector 11, to which a belt loop 60 is attached, is covered by housing caps 61.

As can be seen from FIG. 11, the measuring arrangement, with magnet and magnetic field sensor, is unchanged, for example, relative to the embodiment described in conjunction with FIGS. 5 to 7, with the difference that the belt strap loop 60 is attached directly to the connector 11, so that the tension load that acts on the safety belt acts directly on the connector 11 and effects its relative displacement relative to the stationary holder 10.

As can be seen as a complement thereto from FIG. 12, the holder 10 can comprise a holding portion 10a, which is to be secured to the vehicle, and a separate fitting portion 10b, whereby formed on the fitting portion 10b are the lateral arms 17 which are engaged by the springs 21 and that cooperate with the connector 11. The two-part embodiment of the holder provides a greater freedom of construction with regard to the securement of the holder 10 in specific installed positions in a vehicle.

The features of the subject matter of this document disclosed in the preceding specification, the patent claims, the abstract and the drawing can be important not only individually but also in any desired combinations with one another for realizing the various embodiments of the invention.

The specification incorporates by reference the disclosure of German priority document 102 17 227.7 filed Apr. 18, 2002 and PCT/EP03/03965 filed Apr. 16, 2003.

The present invention is, of course, in no way restricted to the specific disclosure of the specification and drawings, but also encompasses any modifications within the scope of the appended claims.

The invention claimed is:

1. A fastening arrangement for a safety belt in a vehicle, comprising:
   a holder for securement to said vehicle, wherein said holder is provided with a T-shaped head having arms that extend laterally relative to a longitudinal axis of said holder;
   a connector that is moveably disposed, against spring action, on said holder, wherein said connector is adapted to be connected to a belt buckle or a belt strap loop, and wherein said connector is provided with abutments positioned opposite said arms of said holder;
   a magnet and a magnetic field sensor disposed on said holder and said connector, wherein a relative movement between said magnet and said magnetic field sensor caused by displacement of said connector relative to said holder, which displacement is effected by tension acting on said safety belt, is converted into a signal that corresponds to the acting belt force;
   first springs provided on outer longitudinal sides of said holder and said connector, wherein respective ones of said first springs extend between each of said arms of said holder and an oppositely disposed abutment of said connector, and wherein said first springs counteract a tension force of said safety belt or said belt buckle; and
   a compensation spring that is disposed between, and is respectively supported on, said holder and said connector, wherein said compensation spring, without a tension force acting on said connector, prestresses said connector relative to said holder against nearly relaxed ones of said first springs with a spring force that is set low.

2. A fastening arrangement according to claim 1, wherein said connector comprises two plates that are disposed parallel to one another, wherein enclosed between said two plates are said T-shaped heads of said holder, including said arms of said holder, and wherein said abutments on said connector for said first springs are formed by connecting flanges that are disposed perpendicular to planes of said plates.

3. A fastening arrangement according to claim 1, wherein said first springs are respective compression springs that are respectively supported between said arms of said holder and said abutments of said connector.

4. A fastening arrangement according to claim 3, wherein said connector is provided with a bearing surface against which said T-shaped head of said holder is supported under the action of said first springs.

5. A fastening arrangement according to claim 3, wherein guide members are formed on said arm of said T-shaped head and on said abutments of said connector, and wherein said guide members project in a direction of extension of said compression springs.

6. A fastening arrangement according to claim 1, wherein said connector is connected via a connecting device with a buckle housing of said belt buckle.

7. A fastening arrangement according to claim 1, wherein said connector is a monolithic component of a buckle housing of said belt buckle.

8. A fastening arrangement according to claim 7, wherein said buckle housing has a U-shaped configuration and includes a base plate and laterally projecting U-legs, wherein to form said monolithic connector said base plate of said buckle housing is provided with an axial extension portion, and wherein said abutments are formed on an end of said base plate accompanied by the formation of a space between said abutments and said U-legs.

9. A fastening arrangement according to claim 8, wherein said arms of said holder, including said first springs, are disposed in said space.

10. A fastening arrangement according to claim 8, wherein said holder is secured to said base plate of said buckle housing so as to be relatively moveable thereto.

11. A fastening arrangement according to claim 1, wherein said holder is embodied as a rigid component or as a flexible cable holder.

12. A fastening arrangement according to claim 2, wherein said magnet comprises a bar magnet that is oriented in a longitudinal direction of said holder and said connector, and is mounted on an inner side of said connector that faces said T-shaped head of said holder, and wherein said magnet field sensor is mounted on said T-shaped head of said holder such that a longitudinal axis of said magnetic field sensor is disposed at right angles to a longitudinal axis of said bar magnet and within a magnetic field of said bar magnet.

13. A fastening arrangement according to claim 12, wherein said bar magnet is mounted on one of said plates of said connector, and wherein a cutout that spans said magnetic field sensor is formed on the other plate.

14. A fastening arrangement according to claim 1, wherein said magnet comprises a bar magnet that is oriented in a longitudinal direction of said holder and said connector and is rotatably mounted on said connector, wherein said magnet field sensor, which detects a change in position of said bar magnet, is disposed on said connector, and wherein during displacement of said holder relative to said connector, said holder deflects said bar magnet out of its orientation in the longitudinal direction of said connector.

15. A fastening arrangement according to claim 14, wherein said T-shaped head of said holder engages against said rotatably mounted bar magnet via an articulated lever arm.

16. A fastening arrangement according to claim 8, wherein said magnetic field sensor is mounted on said holder, wherein said magnet is in the form of a bridge that spans the base plate of said buckle housing and is fixed into position on said lateral U-legs of said buckle housing, and wherein said bridge is disposed in such a way that said magnetic field sensor is disposed below said magnet bridge.

17. A fastening arrangement according to claim 16, wherein said magnetic field sensor is fixed in position on said holder via a sealing compound that encases it.

18. A fastening arrangement according to claim 1, wherein said magnetic field sensor is disposed within a magnetic field of said magnet in such a way that a change of the magnetic field connected with a change in position of said magnet is received by said magnetic field sensor.

19. A fastening arrangement according to claim 18, wherein said compensation spring is embodied as a pre-bent flat spring having a central portion that is fixed in position against said connector, wherein laterally outer ends of said compensation spring act upon said holder with pre-stress, and wherein upon a relative displacement of said connector relative to said holder, said outer ends of said compensation spring come free from said holder due to tension force that engages said connector.

20. A fastening arrangement according to claim 1, wherein said holder has a two-part configuration, including a holding portion that is to be secured to said vehicle, and a fitting portion that is provided with said arms and cooperates with said connector.

21. A fastening arrangement according to claim 1, wherein a belt strap loop directly engages said connector.

* * * * *

UNITED STATES PATENT AND TRADEMARK OFFICE
CERTIFICATE OF CORRECTION

PATENT NO. : 7,357,419 B2  Page 1 of 1
APPLICATION NO. : 10/511917
DATED : April 15, 2008
INVENTOR(S) : Kock et al.

It is certified that error appears in the above-identified patent and that said Letters Patent is hereby corrected as shown below:

Title Page, and Col. 1

Item [54] should read as follows:

[54] Title: FASTENING ARRANGEMENT, FOR A SAFETY BELT BUCKLE,

EQUIPPED FOR MEASURING THE BELT FORCE

Signed and Sealed this

Twenty-third Day of December, 2008

JON W. DUDAS
*Director of the United States Patent and Trademark Office*